INVENTORS
Eric H. Bowers &
Oswald Thoma

ATTORNEYS
Reynolds & Christian

June 4, 1963

O. THOMA ETAL 3,091,930

HYDRAULIC APPARATUS

Filed Aug. 9, 1960

INVENTOR
OSWALD THOMA
ERIC H. BOWERS

BY *Reynolds + Christensen*

ATTORNEY

United States Patent Office 3,091,930
Patented June 4, 1963

3,091,930
HYDRAULIC APPARATUS
Oswald Thoma, Grunwald, uber Munich, Germany, and Eric H. Bowers, Cheltenham, England, assignors to Dowty Hydraulic Units Limited, Cheltenham, England, a British company
Filed Aug. 9, 1960, Ser. No. 48,385
Claims priority, application Great Britain Aug. 14, 1959
12 Claims. (Cl. 60—53)

This invention relates to hydraulic apparatus and more particularly to hydrostatic power transmissions for transmitting power from a power source to a load. One object of the present invention is to provide a simple means for obtaining speed ratio adjustment of the transmission.

In accordance with the present invention a hydrostatic power transmission to transmit power from a power source to a load and vice versa comprises a positive displacement pump driven by the power source, a first and a second positive displacement motor connected hydraulically in parallel to the output of the pump, a mechanical connection from each motor to the load, a clutch assembly in the mechanical connection of the first motor, a valve controlling the hydraulic connection to the first motor, and pressure responsive means to respond to hydraulic pressure at the first motor to cause the clutch assembly to engage when the first motor pressure is high and to disengage the clutch when the first motor pressure is low. When the valve is open the two motors are hydraulically in parallel with the pump and they will both drive the load at low speed at considerable mechanical advantage. When the valve is closed the first motor is isolated hydraulically and the pump output will be concentrated on the second motor which will then drive the load at a higher speed and a lower mechanical advantage. Closure of the valve will cause loss of hydraulic pressure at the first motor which in turn will cause the pressure responsive means to disengage the clutch assembly so that there is no connection between the load and the first motor.

The clutch assembly may comprise a double-acting unidirectional clutch assembly to insure clutch disengagement during the transition from low to high speed. The transmission pump may be of reversible positive displacement. The transmission as described may be used for vehicle propulsion, in which case the two motors may be used for driving separate ground engaging wheels. This will insure increased ground adhesion in low gear.

One example of the invention will now be described with reference to the accompanying drawings in which.

Figure 1:
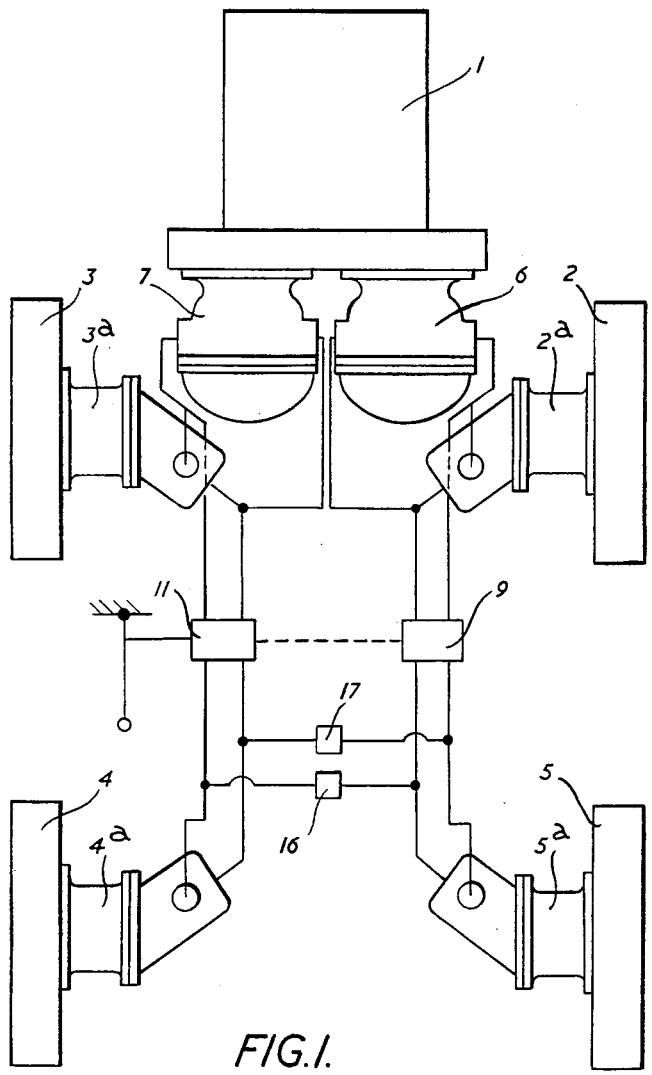
FIGURE 1 is a diagrammatic representation of a pair of hydraulic power transmissions arranged for driving the wheels of the scraper illustrated in FIGURE 2.
Figure 2:
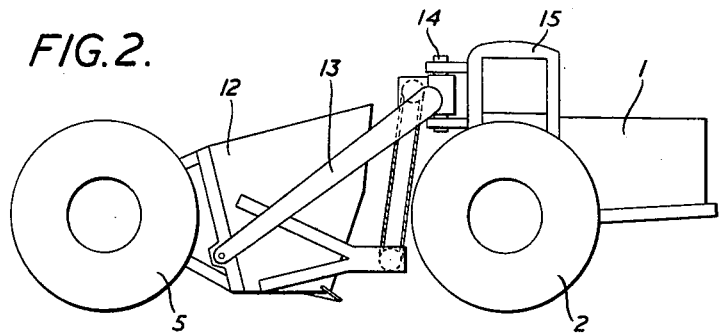
FIGURE 2 is a diagrammatic representation of a self-powered earth scraper vehicle to which the invention is applied.
Figure 4:
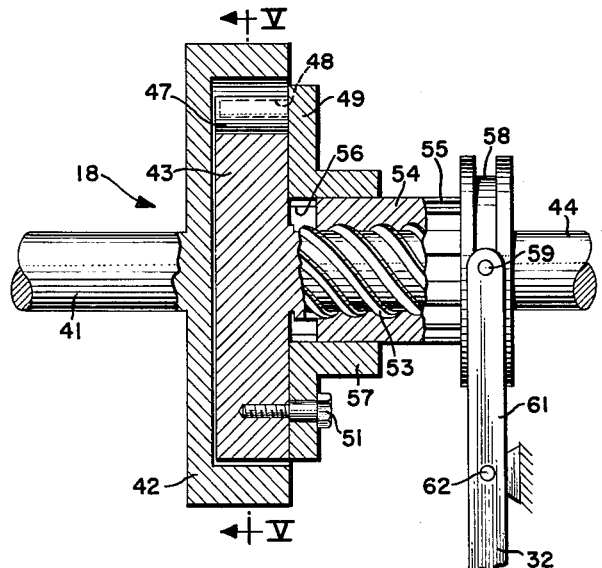
FIGURE 4 is a cross section through a typical double-acting unidirectional clutch.
Figure 5:
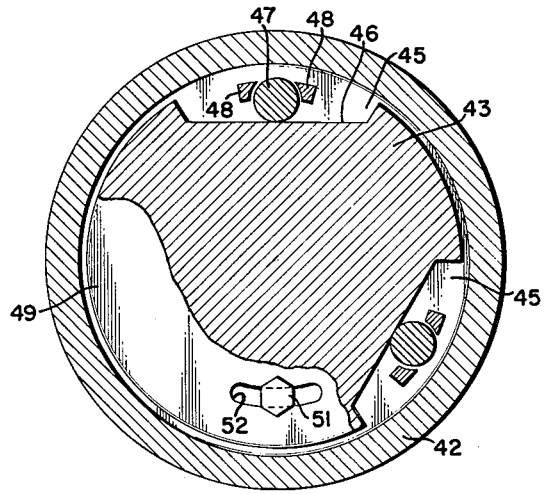
FIGURE 5 is a cross section on the line 5—5 of FIGURE 4.

Referring now to FIGURES 1 and 2, a diesel engine 1 is provided to supply power for the propulsion of the scraper having four ground engaging wheels, 2, 3, 4 and 5. The wheels are each provided with a separate hydraulic motor, 2a, 3a, 4a and 5a. The engine 1 is connected to drive a pair of reversible variable positive displacement pumps 6 and 7. The hydraulic output of the pump 6 is connected directly to the motor 2a and through a shutoff valve 9 to the motor 5a, these two motors driving wheels 2 and 5 on one side of the vehicle. The motor 5a in its connection to wheel 5, includes a double-acting uni-directional clutch. The pump 7 is connected directly to the motor 3a, at the front wheel 3 and through a shut-off valve 11 to the motor 4a of rear wheel 4. The connection between motor 4a and the rear wheel 4 includes a similar double-acting uni-directional clutch, such as is shown in FIGURES 4 and 5. The scraper having the transmissions as described comprises an earth scraping implement or bucket 12 carried by a framework 13 supported at its rear by the rear wheels 4 and 5 and at its front by a steering pivot 14 carried by the front wheels 2 and 3. Also on the front wheels 2 and 3 the engine 1 is mounted together with a driving cab 15 occupied by the driver driving the scraper. A servo operated steering mechanism is provided which acts on the pivot 14 to move the framework 13 relatively to the front wheels 2 and 3 about the axis of the pivot and at the same time to control the differential speed setting of the pumps 6 and 7. Such an arrangement is disclosed particularly in the prior application Serial No. 13,872, filed March 9, 1960, by E. H. Bowers, now abandoned. This steering mechanism is arranged to be correctly co-ordinated when the valves 9 and 11 are closed, i.e. when the vehicle is arranged to travel at higher speeds and the two transmissions are in their higher speed ratio range. In the case where the valves 9 and 11 are open so that all four motors receive hydraulic liquid there will not be co-ordination between the movement of the carriage about the pivot 14 and the differential adjustment of pump displacement 6 and 7 for steering. This will result when the vehicle is moving forwardly in other than a straight path with the wheels on the outer side of the curved path being driven too quickly. As a result, these motors will tend to spin their wheels 2 and 5, whilst the wheels on the inner side of the curved path will tend to drag. To overcome the loss of power that would result the transmissions on the two sides of the vehicle are interconnected by restrictors or non-return valves 16 and 17 which allow limited flow of high pressure liquid from one transmission to the other on such occasions.

In operation of the scraper vehicle for scraping earth, the valves 9 and 11 will be opend so that all wheels are driven and the vehicle, in effect, is in low gear, the actual value of the gear ratio depending on the selected displacement of pump 6 and 7. In particular, since all wheels are driven, ground adhesion will be at its maximum and the propulsive thrust exerted on the vehicle may rise to a very high value. At the end of the scraping run when the bucket of the scraper is loaded with earth, the bucket is raised by the framework 13. The valves 9 and 11 are then gradually shut, isolating the motors 4a and 5a. The drive will then be transferred entirely to the front wheels 2 and 3 and the speed ratio of the transmissions will be doubled so that the vehicle can run at approximately twice the scraping speed for a given pump displacement. In this condition the vehicle is driven and steered to a position where it can unload and then return for another scraping operation.

Such operation of the scraper, in particular the transition from low to high speeds, involves operation of the double-acting unidirectional clutches which will now be described with reference to FIGURES 3, 4 and 5.

Figure 3:
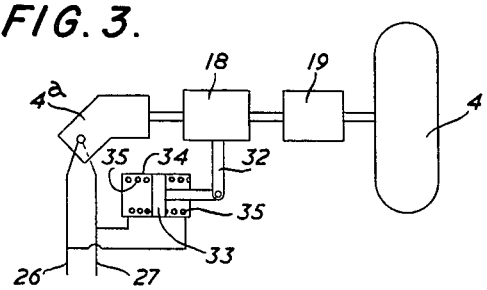
FIGURE 3 is a diagrammatic representation of the control of the unidirectional clutch mechanism associated with each rear wheel of the scraper illustrated in FIGURES 1 and 2.

Referring particularly to FIGURE 3 the motor 4a is arranged for driving the wheel 4 through the medium of the double-acting unidirectional clutch unit 18 and reduction gearing 19. A control level 32 is provided to cause unidirectional operation of the clutch in one direction or the other. The lever 32 is controlled by a piston 33 mounted within a cylinder 34 and centrally located therein by preloaded springs 35. The piston 33 and the cylinder 34 form the pressure responsive means connected across the hydraulic connections 26 and 27 to the hydraulic motor. The arrangement is such that when the motor 4a is driving, i.e., when operating in low speed in the forward direction, the pipe 26 is under pressure and this pressure is applied to the right hand end of cylinder 34 moving piston 33 to the left. Such movement will cause lever 32 to engage the unidirectional clutch appropriately to transmit drive from motor 4a to wheel 4. When the transition is selected from low speed to high speed by closing the valve 11 the unidirectional clutch will permit the wheel 4 to carry on moving without transmitting this movement to the motor 4a. In this way the pressure difference between pipes 26 and 27 will be permitted to drop to a low value so that the springs 35 may center the piston 33 to cause complete disengagement of the unidirectional clutch. When traveling in low gear in a forward direction and the driver brakes the vehicle through the transmission by reducing the displacement of the pump the scraper vehicle will override the ground engaging wheels so that they drive their respective motors. This will involve reversal of the pressure difference between the pipes 26 and 27. As far as the wheel 4 is concerned as shown in FIGURE 3 the reversal of torque will initially cause the unidirectional clutch to slip so that the torque will not be transmitted to the motor. However, the fact that the parallel connected motor 3a is also being driven by its wheel will create an opposite pressure difference between the pipes 26 and 27 which will cause the unidirectional clutch 18 to engage in the opposite direction so that the braking torque may be transmitted from the wheel 4 to the motor 4a.

In the case that the vehicle is being driven in reverse and the change is made from low to high speed or alternatively the vehicle is braked by reducing pump displacement the operations as described will still occur but in the reverse senses.

Reference is now made to the example of a double-acting unidirectional clutch illustrated in FIGURES 4 and 5. The input shaft 41 from the motor 4a is connected to an integrally formed drum unit 42. Internally of the drum unit a pawl carrier 43 in the form of a disk is rotatably mounted. From the pawl carrier 43 a drive shaft 44 extends to the reduction gear 19. In the periphery of the pawl carrier 43 three recesses 45 are formed. Each recess 45 includes a flat chordally disposed base 46 on which a pawl 47 in the form of a roller is located for rolling. Each pawl 47 is located in its operative position by means of a pair of arms 48 extending from a control disk 49. The control disk 49 is located on the carrier 43 for limited angular movement by means of bolts 51 screw threadedly secured in the carrier 43 and engaging in slots 52 in the control disk. For causing limited angular movement of the control disk 49 a quick pitch screw thread 53 is formed on the portion of the shaft 44 immediately adjacent to the pawl carrier 43 and on this screw thread a slide 54 is fitted. The outer surface of the slide includes splines 55 for cooperation with corresponding splines 56 formed in the inner surface of a hub 57 extending from control disk 49. The outer end of the slide 54 is grooved at 58 for engagement by pins 59 of a forked lever 61 having a fulcrum 62. The opposite end of the forked lever forms the lever 32 in FIGURE 3.

Movement of lever 32 to the right will urge slide 54 to the left and by virtue of the quick pitch thread 53 will cause clockwise rotation as seen in FIGURE 5 of the control disk 49 relative to the pawl carrier 43. This will move the pawls 47 by virtue of the arms 48 to the clockwise ends of the recesses 45 to wedge between the bases of the recesses and the internal periphery of the drum 42. Presuming now that the drum 42 is moved in a clockwise sense relative to the carrier 43 as seen in FIGURE 5 it will be seen that rollers 47 are rolled into tight engagement between the bases 46 and the internal periphery of drum 42 locking them together so in effect that clockwise drive supplied to the drum 42 will cause the carrier 43 and shaft 44 to rotate. This will happen assuming that the motor 4a is supplying driving torque to the wheel 4. If the valve 11 is closed to select high gear, motor 4a is hydraulically isolated and the wheel 4 will tend to drive the motor 4a. The pawl carrier 43 will then be rotated in a clockwise sense against some resistance from the motor 4a. This movement will tend to cause the pawls 47 to move away from the wedging position and will permit the carrier 43 to rotate without causing drum 42 to rotate. This will then result in loss of pressure between pipes 26 and 27 causing the lever 32 to move to a central position which in turn will cause the pawls 47 to move to the central position as illustrated in FIGURE 5.

Assume now that low gear is selected so that the drum 42 is rotated by motor 4a in the clockwise sense to drive wheel 4 through the clutch and that the driver reduces selected pump displacement in order to brake the vehicle. The speed of motor 4a will reduce but wheel 4 will still tend to rotate at the same speed which will cause pawl carrier 43 to be rotated in a clockwise sense relative to drum 42. The pawls 47 will not now lock. Since the motor 3a is positively connected to the wheel 3 it will be driven by this wheel and a reversed pressure will be generated between the pipes 26 and 27 causing lever 32 to be moved oppositely so that slide 54 as seen in FIGURE 4 is moved to the right and control disk 49 is moved in an anti-clockwise sense relative to the pawl carrier 43. This movement will move pawls 47 into the counterclockwise position in recesses 45 so that clockwise rotation of shaft 44 will now cause the pawls 47 to wedge between the pawl carrier and the drum 42 thus rotating motor 4a and creating a similar pressure difference to that created at motor 3a.

The opposite operations to those described may equally be carried out when the scraper is moving in the opposite direction. Operations of the unidirectional clutch then take place in the opposite sense. The advantage of using the double-acting unidirectional clutch is that whenever a reversal of transmitted torque occurs the clutch does not transmit such reversed torque unless actuated to do so. The pressure responsive means may act automatically to engage the clutch for transmitting such reversed torque or may maintain the clutch disengaged.

Whilst the invention has been described with respect to transmission employed on vehicles it will be appreciated that in its broadest sense the invention is available for the transmission of power between any power source and load, particularly where the load has considerable inertia. A change of speed ratio from high to low or low to high is of advantage even in the case where the pump itself is of variable positive displacement since in practice it would be found that the range of speed ratio variation with any degree of efficiency is limited to a particular range of pump displacement and the invention thus effectively increases the total range of speed ratio variation. The relative displacements of the two motors are preferably then selected so that with both motors in circuit a range of low speed ratios is obtained by varying pump displacement and with only one motor in circuit a further range of speed ratios is obtained by varying pump displacement.

We claim as our invention:

1. A hydrostatic power transmission to transmit power from a power source to a load and vice versa comprising a positive displacement pump driven by the power source, a first and a second positive displacement motor connected in parallel with the hydraulic output of the pump, a mechanical connection from each motor to the load, a clutch assembly in the mechanical connection with the first motor, a valve controlling the hydraulic connection to the first motor only, and pressure responsive means arranged to respond to hydraulic pressure at the first motor to cause the clutch assembly to engage when the first motor pressure is high and to disengage when the first motor pressure is low.

2. A hydrostatic power transmission as claimed in claim 1, wherein the transmission pump is of a reversible positive displacement type.

3. A hydrostatic power transmission as claimed in claim 1, wherein the clutch assembly comprises a double-acting unidirectional clutch assembly.

4. A hydrostatic power transmission as claimed in claim 3, wherein the transmission pump is of a reversible positive displacement type.

5. A hydrostatic power transmission to transmit power from a power source to a load and vice versa comprising a positive displacement pump driven by the power source, a pair of passages extending from the pump to carry liquid at pressure, a first positive displacement motor connected across the liquid flow passages, a mechanical connection from the first motor to the load, a second motor, a pair of connections from the second motor to the liquid flow passages, a valve controlling liquid flow through the pair of connections, a clutch assembly engageable to connect the second motor to the load, and pressure responsive means to engage the clutch assembly when the pressure difference between the said connections is high and to disconnect the clutch assembly when the pressure difference between the said connections is low.

6. A hydrostatic power transmission as claimed in claim 5 wherein the clutch assembly comprises a double acting unidirectional clutch assembly.

7. A hydrostatic power transmission as claimed in claim 5 wherein the transmission pump is of a reversible positive displacement type.

8. A hydrostatic power transmission as claimed in claim 6 wherein the transmission pump is of a reversible positive displacement type.

9. In combination with a mechanical load, a power source, a positive displacement pump driven by the power source, a pair of transmission systems connecting the pump and the load, each of which transmission systems comprises a positive displacement hydraulic motor having, on one hand, an operative hydraulic connection with the pump to receive at least a portion of its output and, on the other, an operative mechanical connection with the load to deliver power thereto, valve means operative to divert the entire pump output into one of said transmission systems, clutch means operative to engage and disengage the hydraulic motor in the other of said transmission systems with and from the load, and clutch actuator means responsive to pressure in said other transmission system to cause the clutch to engage said motor therein with the load, above a predetermined pressure, and to cause the clutch to disengage said motor from the load, below said pressure.

10. The combination according to claim 9 wherein the valve means is disposed in the hydraulic connection between the pump and the motor in said other transmission system and the clutch actuator means is responsive to the pressure in said other transmission system on the opposite side of the valve means from the pump.

11. The combination according to claim 9 wherein the pump is of a reversible positive displacement type.

12. The combination according to claim 9 wherein the clutch is of a double-acting uni-directional type.

References Cited in the file of this patent

UNITED STATES PATENTS

| 2,398,265 | Tyler | Apr. 9, 1946 |
| 2,674,093 | Slomer | Apr. 6, 1954 |
| 2,942,421 | Hann et al. | June 28, 1960 |
| 2,961,829 | Weisenbach | Nov. 29, 1960 |

FOREIGN PATENTS

| 241,234 | Great Britain | Oct. 12, 1925 |